United States Patent
Nakano (10) Patent No.: US 9,756,606 B2
(45) Date of Patent: Sep. 5, 2017

(54) WIRELESS COMMUNICATION DEVICE

(71) Applicant: MITSUBISHI ELECTRIC CORPORATION, Tokyo (JP)

(72) Inventor: Hisao Nakano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/120,725

(22) PCT Filed: May 15, 2014

(86) PCT No.: PCT/JP2014/062972
§ 371 (c)(1),
(2) Date: Aug. 22, 2016

(87) PCT Pub. No.: WO2015/173929
PCT Pub. Date: Nov. 19, 2015

(65) Prior Publication Data
US 2017/0013592 A1    Jan. 12, 2017

(51) Int. Cl.
| | |
|---|---|
| *H04W 68/02* | (2009.01) |
| *H04W 16/16* | (2009.01) |
| *H04W 76/02* | (2009.01) |
| *H04W 16/14* | (2009.01) |
| *H04W 68/00* | (2009.01) |
| H04W 84/12 | (2009.01) |
| H04W 88/06 | (2009.01) |
| H04W 4/00 | (2009.01) |

(52) U.S. Cl.
CPC ......... *H04W 68/02* (2013.01); *H04W 16/14* (2013.01); *H04W 68/005* (2013.01); *H04W 76/02* (2013.01); *H04W 4/008* (2013.01); *H04W 76/026* (2013.01); *H04W 84/12* (2013.01); *H04W 88/06* (2013.01)

(58) Field of Classification Search
CPC ...... H04W 68/02; H04W 16/16; H04W 76/02
See application file for complete search history.

(56) References Cited

U.S. PATENT DOCUMENTS

| | | | |
|---|---|---|---|
| 8,094,597 B1 * | 1/2012 | Chhabra | H04W 52/0235 370/311 |
| 9,320,014 B2 * | 4/2016 | Bai | H04W 68/02 |
| 2004/0185857 A1 | 9/2004 | Lee et al. | |
| 2004/0203362 A1 * | 10/2004 | Pattabiraman | H04W 52/241 455/41.2 |

(Continued)

FOREIGN PATENT DOCUMENTS

| | | |
|---|---|---|
| JP | 2005-500745 A | 1/2005 |
| JP | 2005-286626 A | 10/2005 |

(Continued)

*Primary Examiner* — Christopher M Brandt
(74) *Attorney, Agent, or Firm* — Birch, Stewart, Kolasch & Birch, LLP (57) ABSTRACT

When a wireless communication device is performing wireless communications of real time data by using a wireless LAN method, and the degree of influence of paging a communications partner in an automatic connection operation for a Bluetooth method upon the wireless communications using the wireless LAN method is higher than a permissible upper limit, the wireless communication device changes the paging operation in such a that the degree of influence is reduced.

5 Claims, 5 Drawing Sheets (56) References Cited

U.S. PATENT DOCUMENTS

| | | |
|---|---|---|
| 2005/0215197 A1 | 9/2005 | Chen et al. |
| 2010/0316027 A1 | 12/2010 | Rick et al. |
| 2010/0329231 A1 | 12/2010 | Sekiya et al. |
| 2011/0216683 A1* | 9/2011 | Ju .................. H04W 52/00 370/311 |
| 2011/0237188 A1* | 9/2011 | Sen .................. H04B 15/00 455/41.2 |
| 2011/0249603 A1 | 10/2011 | Rick et al. |
| 2012/0034913 A1* | 2/2012 | Wang ................ H04W 16/14 455/426.1 |
| 2013/0010766 A1* | 1/2013 | Sadek ............. H04W 72/1215 370/336 |
| 2016/0036512 A1* | 2/2016 | Rick .................. H04B 1/006 375/267 |

FOREIGN PATENT DOCUMENTS

| | | |
|---|---|---|
| JP | 2011-9948 A | 1/2011 |
| JP | 2012-530472 A | 11/2012 |

\* cited by examiner

WIRELESS COMMUNICATION DEVICE

FIELD OF THE INVENTION

The present invention relates to a wireless communication device that can simultaneously use wireless communications using a wireless LAN (Local Area Network) method and wireless communications using a Bluetooth (registered trademark; this description will be omitted hereafter) method.

BACKGROUND OF THE INVENTION

In recent years, in vehicle-mounted equipment, such as a car navigation device, a plurality of wireless communications methods are installed and used for various applications. For example, wireless communications using a Bluetooth method are performed between the vehicle-mounted equipment and a terminal, such as a mobile phone or an audio player, and are used for a handsfree call, a dial-up connection, music playback, etc.

Further, wireless communications using a wireless LAN method, such as IEEE802.11b/g/n, are performed between the vehicle-mounted equipment and a terminal, such as a smart phone or a tablet, and are used for various applications such as transmission of video image/music and navigation.

Wireless communications using a Bluetooth method and wireless communications using a wireless LAN method use the same 2.4 GHz frequency band. Therefore, there occurs a problem that when these wireless communications are used simultaneously, radio wave interference occurs, more specifically, the wireless communication methods interfere with each other and both the communication qualities degrade.

Further, wireless communications using a Bluetooth method, which are installed in, for example, a car navigation device have an automatic connection function of automatically establishing a communication connection with communication equipment with which pairing has been established.

At the time of making a request for this automatic connection, the car navigation device pages the Bluetooth device with which pairing has been established, such as a mobile phone. At this time, when receiving a response from the Bluetooth device which is the paging destination, the car navigation device makes an automatic connection. When not receiving a response from the device which is the paging destination, the car navigation device continuously or periodically makes an automatic connection request until the car navigation device can make a connection with the device.

According to the Bluetooth specification, it is necessary to, in the paging operation, use 32 frequency channels which are determined uniquely from the device address of the Bluetooth device which is the destination slave. Therefore, a channel to be used cannot be selected at the time of the paging operation, and the automatic frequency hopping (AFH) function does not work. As a result, the frequencies used for Bluetooth and those used for wireless LAN cannot be separated from each other, and radio frequency interference cannot be prevented from occurring. Similarly, according to the Bluetooth specification, time slots are continuously used in the wireless communications using the Bluetooth method at the time of the paging operation. Therefore, the wireless communications using the Bluetooth method and those using the wireless LAN method cannot be used in a time-sharing manner.

As a method of preventing such radio frequency interference as above due to a paging operation for Bluetooth, there can be provided a method of giving a higher priority to either a wireless LAN or Bluetooth.

For example, patent reference 1 discloses a device that controls the priority of a wireless LAN and that of Bluetooth in MAC levels, thereby preventing radio frequency interference in wireless communications using the wireless LAN and those using Bluetooth.

The device described in patent reference 1 gives a higher priority to Bluetooth packets at the time of performing a paging operation for Bluetooth to give a higher priority to Bluetooth than to the wireless LAN, thereby preventing radio frequency interference.

RELATED ART DOCUMENT

Patent Reference

Patent reference 1: Japanese Unexamined Patent Application Publication (Translation of PCT Application) No. 2012-530472

SUMMARY OF THE INVENTION

Problems to be Solved by the Invention

Because the conventional technique represented by patent reference 1 gives a higher priority to Bluetooth packets than to wireless LAN packets during the paging operation, the transmission speed of the wireless LAN decreases.

Therefore, a problem is that when the paging operation for Bluetooth is periodically or continuously performed while communications of data having real-time nature, such as streaming data, are performed via the wireless LAN, the communication quality degrades due to a decrease in the transmission speed of the wireless LAN.

The present invention is made in order to solve the above-mentioned problem, and it is therefore an object of the present invention to provide a wireless communication device that reduces the influence of an automatic connection function for Bluetooth, thereby being able to ensure the communication quality of a wireless LAN.

Means for Solving the Problem

According to the present invention, there is provided a wireless communication device that can perform wireless communications using a wireless LAN method and wireless communications using a Bluetooth method, the wireless communication device including: a real-time nature determinator to determine whether or not the wireless communication device is performing wireless communications of data having real-time nature by using the wireless LAN method; an automatic connection controller to control an automatic connection operation in the wireless communications using the Bluetooth method; a degree of influence determinator to determine the degree of influence of paging a communications partner in the automatic connection operation upon the wireless communications using the wireless LAN method when the wireless communication device is performing wireless communications of data having real-time nature by using the wireless LAN method; and a control changer to change the paging operation by the automatic connection controller when the degree of influence is higher than a permissible upper limit, in such a way that the degree of influence is reduced.

Advantages of the Invention

According to the present invention, there is provided an advantage of reducing the influence of the automatic connection function for Bluetooth, thereby being able to ensure the communication quality of the wireless LAN.

EMBODIMENTS OF THE INVENTION

Hereafter, in order to explain this invention in greater detail, the preferred embodiments of the present invention will be described with reference to the accompanying drawings.

Embodiment 1

Figure 1:
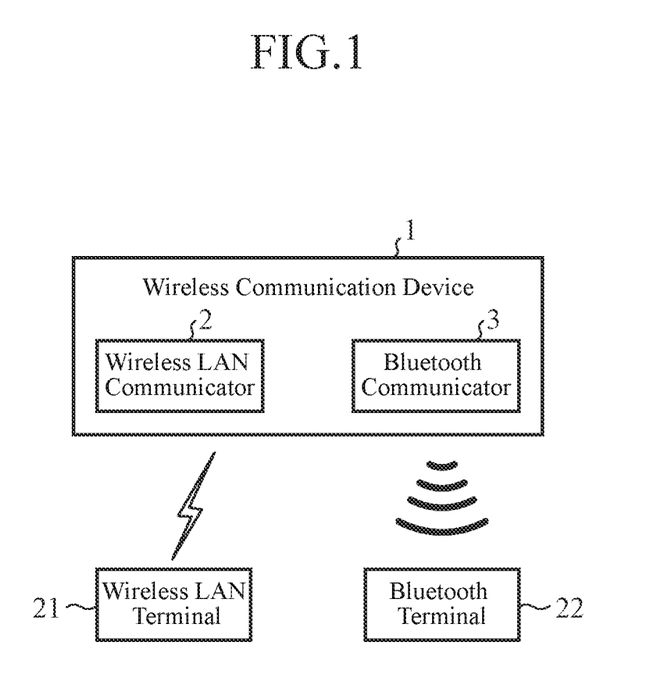
FIG. 1 is a block diagram showing the configuration of an in-vehicle wireless communication system including a wireless communication device according to Embodiment 1 of the present invention.

FIG. 1 is a block diagram showing the configuration of an in-vehicle wireless communication system including a wireless communication device according to Embodiment 1 of the present invention. The in-vehicle wireless communication system shown in FIG. 1 includes the wireless communication device 1 according to Embodiment 1, a wireless LAN terminal 21 and a Bluetooth terminal 22.

The wireless communication device 1 is disposed as, for example, a wireless communication device of a car navigation device, and includes a wireless LAN communicator 2 and a Bluetooth communicator 3.

The wireless LAN communicator 2 performs wireless communications using a wireless LAN method, and performs communications between itself and the wireless LAN terminal 21. The Bluetooth communicator 3 performs wireless communications using a Bluetooth method, and performs communications between itself and the Bluetooth terminal 22.

When the Bluetooth communications are not connected, the Bluetooth communicator 3 performs an automatic connection request at predetermined time intervals, and performs paging of a communications partner with which pairing has been established. In the paging, 32 frequency channels, which are uniquely determined from the device address which is the paging destination, are used. When the frequencies of these channels used for paging coincide with those of wireless LAN operation channels, there is a case in which the transmission speed of the wireless LAN decreases because of the paging operation.

To solve this problem, according to the present invention, when the paging operation for Bluetooth exerts an influence upon communications using the wireless LAN, the paging operation is changed in such away that the degree of influence is reduced. By doing in this way, the wireless communication device reduces the influence of the automatic connection function for Bluetooth, thereby being able to ensure the communication quality of the wireless LAN.

The wireless LAN terminal 21 performs wireless communications using the wireless LAN method. For example, as the wireless LAN terminal, a mobile communication terminal carried into a vehicle, such as a smart phone or a tablet PC, is provided.

The Bluetooth terminal 22 performs wireless communications using the Bluetooth method. As the Bluetooth terminal, a mobile communication terminal as above is provided.

Figure 2:
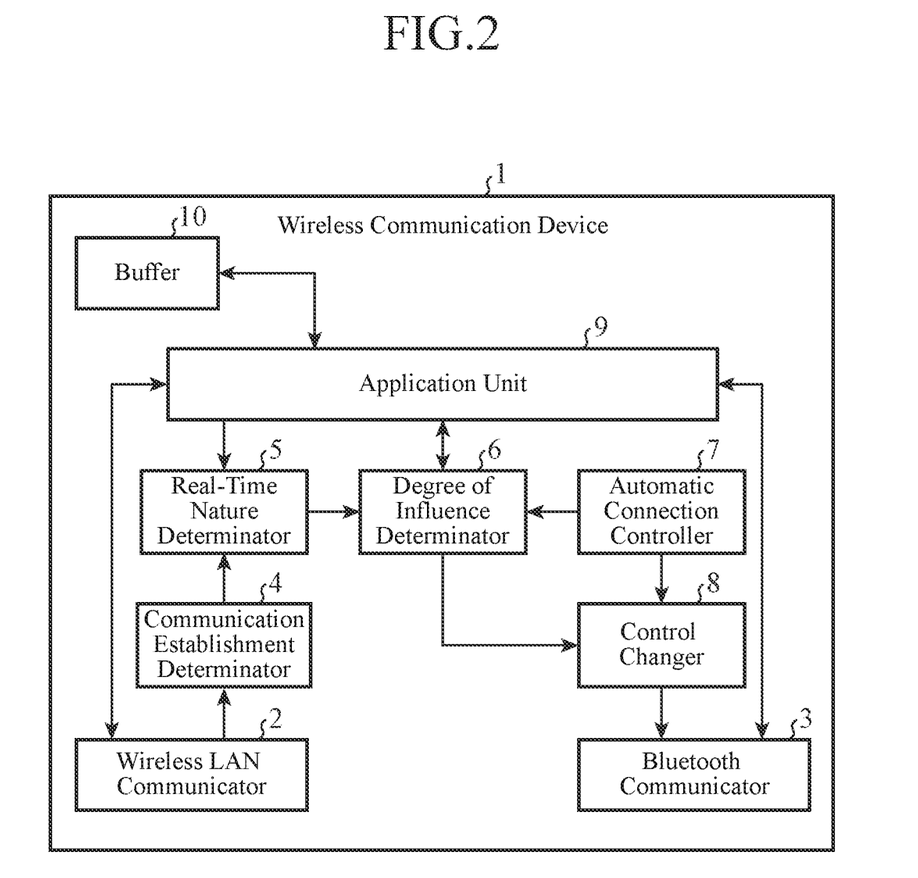
FIG. 2 is a block diagram showing the configuration of the wireless communication device according to Embodiment 1.

FIG. 2 is a block diagram showing the configuration of the wireless communication device according to Embodiment 1. The wireless communication device 1 includes the wireless LAN communicator 2, the Bluetooth communicator 3, a communication establishment determinator 4, a real-time nature determinator 5, a degree of influence determinator 6, an automatic connection controller 7, a control changer 8, an application unit 9, and a buffer 10.

The wireless LAN communicator 2 and the Bluetooth communicator 3 perform data communications in response to requests from the application unit 9.

When connection state information from the wireless LAN communicator 2 shows "connection", the communication establishment determinator 4 determines that the wireless LAN communicator 2 has established communications with the wireless LAN terminal 21 (communications partner). The connection state information shows the communication connecting state of the wireless LAN communicator 2, and the wireless LAN communicator 2 generates the connection state information and outputs the connection state information to the communication establishment determinator 4.

The real-time nature determinator 5 determines whether or not the wireless communication device is performing wireless communications of data having real-time nature (referred to as real time data from here on) by using the wireless LAN method.

For example, when the communication establishment determinator 4 determines that communications using the wireless LAN have been established, the real-time nature determinator specifies an application currently being executed in the application unit 9.

When the specified application is one that performs wireless communications of real time data, such as a video image or a piece of music, by using the wireless LAN, the real-time nature determinator determines that the wireless communication device is performing wireless communications of real time data by using the wireless LAN method.

When the wireless communication device is performing wireless communications of real time data by using the wireless LAN method, the degree of influence determinator 6 determines the degree of influence of paging the communications partner in the automatic connection operation upon the wireless communications using the wireless LAN method. For example, when it is determined, on the basis of the descriptions of the control of the paging operation, which are inputted from the automatic connection controller 7, that the paging operation for Bluetooth and the real time communications using the wireless LAN are being performed simultaneously, the degree of influence determinator calculates, as a parameter showing the degree of influence, a buffer storage period of time during which the real time data are stored in the buffer 10, and acquires, as a parameter showing the degree of influence, an automatic connection request period of time during which the paging is performed.

The automatic connection controller 7 controls the automatic connection operation in the wireless communications using the Bluetooth method. The communications partner with which the pairing has been established is registered in the automatic connection controller 7.

When the Bluetooth communicator 3 is in a non-connection state, the automatic connection controller 7 sets the address of the Bluetooth device, which is the registered paging destination slave, to the Bluetooth communicator 3, and performs paging of the communications partner (destination terminal) in the automatic connection operation.

The period of time during which the paging operation is continuously performed when the destination terminal does not exist (the timeout time for paging) has a default value of 5.12 seconds in the Bluetooth specification. While the paging operation is performed, ID packets are transmitted periodically. Further, at the time of an automatic connection request, the operation of paging the destination terminal is performed continuously or repeatedly. Hereafter, the paging duration at the time of an automatic connection request is described as the automatic connection request period of time.

When the degree of influence determined by the degree of influence determinator 6 is higher than a permissible upper limit, the control changer 8 changes the paging operation by the automatic connection controller 7 in such a way that the degree of influence is reduced.

For example, the degree of influence at the time when the automatic connection request period of time is equal to or shorter than the buffer storage period of time is defined as the permissible upper limit.

Therefore, because the degree of influence is higher than the permissible upper limit when the automatic connection request period of time is longer than the buffer storage period of time, the control changer changes the paging operation by the automatic connection controller 7 in such a way that the automatic connection request period of time becomes shorter than the buffer storage period of time.

Further, when the degree of influence is equal to or lower than the permissible upper limit, the control changer 8 does not change the paging operation by the automatic connection controller 7. More specifically, the automatic connection controller 7 performs the paging when the automatic connection request period of time is shorter than the buffer storage period of time.

The application unit 9 is a plurality of applications which are executed by the wireless communication device 1. Further, an application which handles real time data such as streaming data (referred to as areal time application from here on) is included in the application unit 9.

Real time data received via the wireless LAN are temporarily stored in the buffer 10.

Areal time application temporarily stores data received thereby via the wireless LAN in the buffer 10, sequentially reads the data stored in the buffer 10 in synchronization with a reference time, and performs subsequent processes (a display process and so on). More specifically, the real-time nature of the data stored in the buffer 10 is ensured, and the buffer storage period of time is one during which the real-time nature can be ensured.

The communication establishment determinator 4, the real-time nature determinator 5, the degree of influence determinator 6, the automatic connection controller 7 and the control changer 8 can be implemented as units in each of which software and hardware work in cooperation with each other by, for example, causing a microcomputer of the wireless communication device 1 to execute a program in which the processes specific to Embodiment 1 are described.

Next, operations will be explained.

Figure 3:
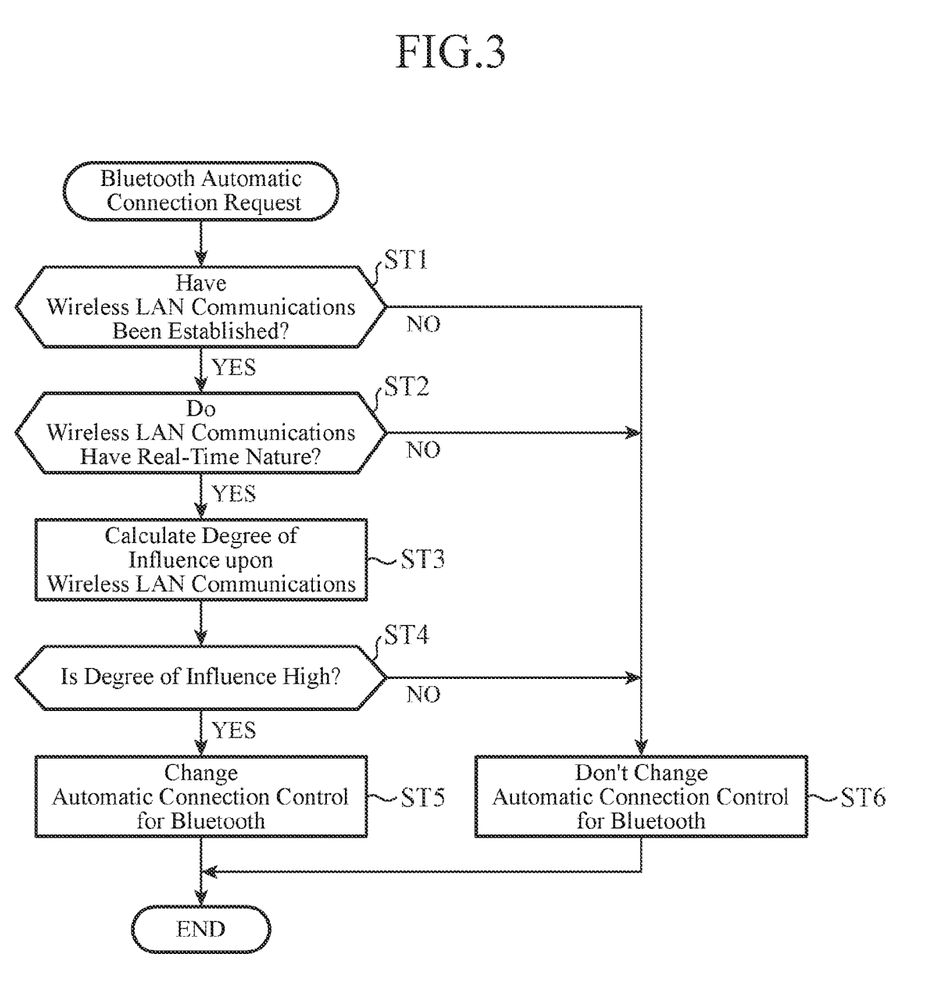
FIG. 3 is a flow chart showing the operation of the wireless communication device according to Embodiment 1.

FIG. 3 is a flow chart showing the operation of the wireless communication device according to Embodiment 1.

First, the automatic connection controller 7 sets the address of the Bluetooth device, which is the registered paging destination slave, to the Bluetooth communicator 3, and performs paging. At this time, the communication establishment determinator 4 determines whether or not wireless LAN communications have been established, on the basis of the connection state information inputted thereto from the wireless LAN communicator 2 (step ST1). When wireless LAN communications have not been established (when NO in step ST1), the wireless communication device makes a transition to a process of step ST6.

In contrast, when wireless LAN communications have been established (when YES in step ST1), the communication establishment determinator 4 notifies the real-time nature determinator 5 to this effect.

When receiving the above-mentioned notification, the real-time nature determinator 5 specifies the application currently being executed from among those in the application unit 9, and determines whether or not the application currently being executed is a real time one, i.e., whether the wireless LAN communications have real-time nature (step ST2). When no real time application is being executed and the wireless LAN communications do not have real-time nature (when NO in step ST2), the wireless communication device makes a transition to step ST6.

In contrast, when a real time application is being executed and the wireless LAN communications have real-time nature (when YES in step ST2), the real-time nature determinator 5 notifies the degree of influence determinator 6 that the wireless LAN communications have real-time nature.

When receiving the notification showing that the wireless LAN communications have real-time nature, the degree of influence determinator 6 determines the degree of influence of paging the communications partner in the automatic connection operation upon the wireless communications using the wireless LAN method (step ST3). For example, the degree of influence determinator 6 calculates, as a parameter showing the degree of influence, the buffer storage period of time, and acquires, as a parameter showing the degree of influence, the automatic connection request period of time from the automatic connection controller 7.

The degree of influence determinator 6 acquires both the data amount of real time data (e.g., streaming data) stored in the buffer 10 at the time of start of the automatic connection request, and the data rate of the real time data from the real time application, and calculates the buffer storage period of time by using the data amount and the data rate. For example, when the amount of data stored in the buffer 10 at the time that the automatic connection request is started is 5 Mbyte and the data rate is 4 Mbps, the buffer storage period of time is 10 seconds (=5 MByte×8 bits/4 Mbps).

Figure 4:
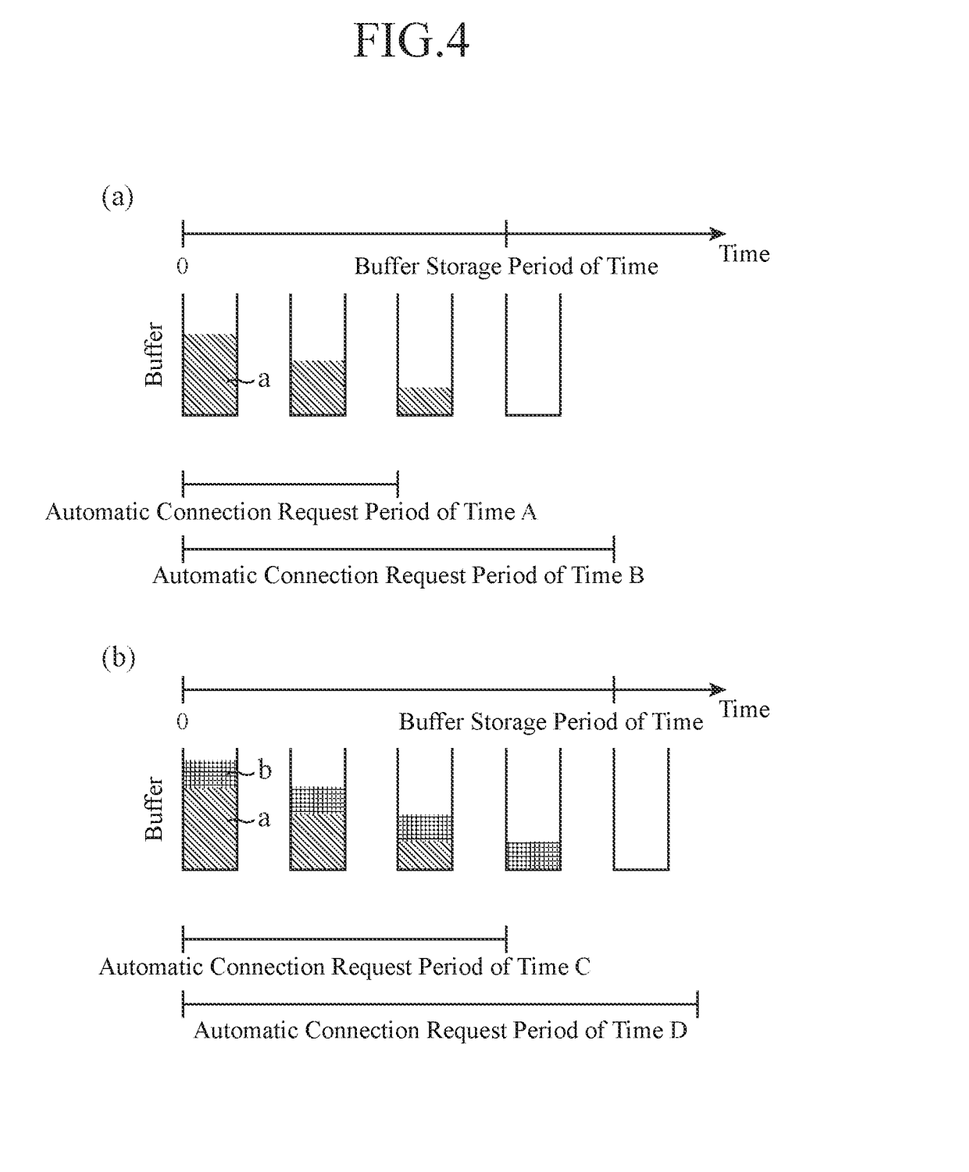
FIGS. 4(a) and 4(b) are diagrams showing an example of automatic connection control for Bluetooth in Embodiment 1.

Next, the degree of influence determinator 6 determines whether or not the degree of influence is higher than the permissible upper limit (step ST4). Here, when the automatic connection request period of time is equal to or shorter than the buffer storage period of time, the degree of influence is equal to or lower than the permissible upper limit. Therefore, as shown in FIG. 4(a), in a case in which an amount of data a is stored in the buffer 1 at the time that the automatic connection request is started (at a time of 0), the degree of influence determinator checks whether the automatic connection request period of time is either A equal to or shorter than the buffer storage period of time, or B longer than the buffer storage period of time.

When the degree of influence is high, i.e., the automatic connection request period of time is longer than the buffer storage period of time (when YES in step ST4), the degree of influence determinator 6 notifies the control changer 8 to this effect.

When receiving the above-mentioned notification from the degree of influence determinator 6, the control changer 8 changes the paging operation by the automatic connection controller 7 in such a way that the above-mentioned degree of influence is reduced (step ST5).

More specifically, the control changer changes the paging operation by the automatic connection controller 7 in such a way that the automatic connection request period of time becomes shorter than the buffer storage period of time. For example, when the automatic connection request period of time is the one B shown in FIG. 4(a), the control changer changes the paging operation in such a way that the automatic connection request period of time becomes the one A.

As mentioned above, the real-time nature of the data is ensured while the data is stored in the buffer 10. Therefore, the wireless communication device can ensure the communication quality of the wireless LAN by ending the paging operation before the buffer 10 becomes empty.

When wireless LAN communications have not been established, when the wireless LAN communications do not have real-time nature, or when the degree of influence is low, i.e., the automatic connection request period of time is equal to or shorter than the buffer storage period of time (when NO in step ST4), the degree of influence determinator 6 notifies the control changer 8 to this effect.

When receiving the above-mentioned notification from the degree of influence determinator 6, the control changer 8 does not change the paging operation by the automatic connection controller 7 (step ST6).

The control changer 8 does not change the paging operation by the automatic connection controller 7 in this way when the degree of influence is equal to or lower than the permissible upper limit. As a result, the wireless communication device can maintain the state in which the degree of influence is lower than the permissible upper limit.

When the automatic connection request period of time is equal to or shorter than the buffer storage period of time, the wireless communication device can ensure the real time communication quality by using the streaming data stored in the buffer 10 even if the wireless communication device cannot receive streaming data via the wireless LAN since the wireless communication device performs the paging operation within the automatic connection request period of time.

Although the example of using the amount of data stored in the buffer 10 at the time that an automatic connection request is started for the determination of the degree of influence, as shown in FIG. 4(a), is shown in the above-mentioned explanation, the present invention is not limited to this example. For example, the degree of influence determinator can determine the degree of influence in consideration of the amount of data received via the wireless LAN within the automatic connection request period of time.

Figure 5:
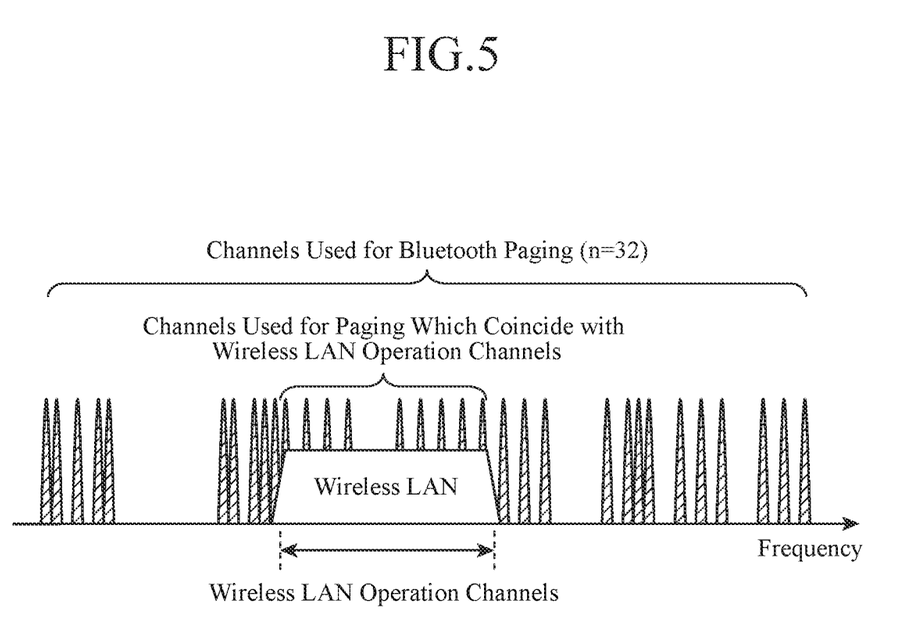
FIG. 5 is a diagram showing a relation between channels used for Bluetooth paging and wireless LAN operation channels.

FIG. 5 is a diagram showing a relation between the channels used for Bluetooth paging and the wireless LAN operation channels. According to the Bluetooth specification, as shown in FIG. 5, the 32 frequency channels (channels used for paging) used in the paging operation can be uniquely determined from the address of the Bluetooth device which is the destination slave. Further, decrease in the transmission speed due to the radio frequency interference in the wireless LAN while the paging operation is performed can be predicted from the number of channels used for paging whose frequencies coincide with those of the wireless LAN operation channels.

For example, the degree of influence determinator 6 acquires the address of the Bluetooth device which is the destination slave from the automatic connection controller 7, and determines the channels used for paging from this Bluetooth device address. The degree of influence determinator then specifies the number of channels whose frequencies coincide with those of the wireless LAN operation channels, as shown in FIG. 5, from among the channels used for paging. Next, the degree of influence determinator predicts the decrease of the speed of the wireless LAN communications on the basis of the specified number of channels, and estimates the transmission speed of the wireless LAN which has received the radio frequency interference caused by the paging operation.

The degree of influence determinator 6 calculates the amount of streaming data b which are received, as shown in FIG. 4(b), within the automatic connection request period of time, on the basis of the transmission speed which is estimated in the above-mentioned way. The amount of data a shown in FIG. 4(b) is the one which is stored in the buffer 10 at the time that the automatic connection request is started, like in the case of FIG. 4(a).

In this way, the degree of influence determinator 6 estimates the amount of data b which will be stored in the buffer 10 until the automatic connection request period of time elapses, and determines, as the buffer storage period of time, a period of time during which data having (the amount of data a+the amount of data b), which is the result of adding the estimated amount of data b to the amount of data a, are stored in the buffer 10.

The degree of influence determinator 6 also determines whether or not the degree of influence is higher than the permissible upper limit by using the above-mentioned buffer storage period of time. Here, the amount of data a is stored in the buffer 10 at the time that the automatic connection request is started (the time 0), as shown in FIG. 4(b), and, when a time elapses and the amount of data b is stored, the degree of influence determinator checks whether the automatic connection request period of time is either C equal to or shorter than the buffer storage period of time, or D longer than the buffer storage period of time. By doing in this way, the wireless communication device can control the paging operation appropriately according to an actual environment.

Because the amount of storage of the buffer 10 is large when using both the amount of data a stored in the buffer 10 at the time that the automatic connection request is started and the amount of data b received within the automatic connection request period of time, for the determination of the degree of influence, the automatic connection request period of time C is longer than the automatic connection request period of time A, as can be seen from FIGS. 4(a) and 4(b). More specifically, the wireless communication device does not have to change the paging operation even if the wireless communication device sets the automatic connection request period of time longer than that in the case of FIG. 4(a).

Although in above-mentioned Embodiment 1 the case in which the wireless communication device 1 is mounted in a car navigation device is explained, this embodiment is not limited to this configuration.

For example, the wireless communication device 1 can be applied to various information devices, such as a smart phone, a tablet PC, a display audio device, and an integrated instrument panel.

As mentioned above, the wireless communication device according to this Embodiment 1 includes: the real-time nature determinator 5 to determine whether or not the wireless communication device is performing wireless communications of data having real-time nature by using the wireless LAN method; the automatic connection controller 7 to control the automatic connection operation in the wireless communications using the Bluetooth method; the degree of influence determinator 6 to determine the degree of influence of paging the communications partner in the automatic connection operation upon the wireless communications using the wireless LAN method when the wireless communication device is performing wireless communications of real time data by using the wireless LAN method; and the control changer 8 to change the paging operation by the automatic connection controller 7 when the degree of influence is higher than the permissible upper limit, in such a way that the degree of influence is reduced.

Because the wireless communication device is configured in this way, the wireless communication device reduces the influence of the automatic connection function for Bluetooth, thereby being able to ensure the communication quality of the wireless LAN.

Further, because the control changer 8 according to this Embodiment 1 does not change the paging operation by the automatic connection controller 7 when the degree of influence is equal to or lower than the permissible upper limit, the wireless communication device can maintain a state in which the degree of influence is lower than the permissible upper limit.

In addition, the wireless communication device according to this Embodiment 1 includes the buffer to temporarily store the real time data, and the degree of influence determinator 6 determines, as parameters showing the degree of influence, the buffer storage period of time during which the real time data are stored in the buffer 10 and the automatic connection request period of time during which the communications partner is paged in the automatic connection operation, and the control changer 8 changes the paging operation by the automatic connection controller 7 when the automatic connection request period of time is longer than the buffer storage period of time, in such a way that the automatic connection request period of time becomes shorter than the buffer storage period of time. Because the wireless communication device is configured in this way, the wireless communication device can end the paging operation before the buffer 10 becomes empty, and can ensure the communication quality of the wireless LAN.

In addition, the automatic connection controller 7 according to this Embodiment 1 pages the communications partner when the automatic connection request period of time is shorter than the buffer storage period of time.

The wireless communication device can ensure the real time communication quality by using the data stored in the buffer 10 even if the wireless communication device cannot receive data via the wireless LAN since the wireless communication device performs the paging operation within the automatic connection request period of time.

In addition, the degree of influence determinator 6 according to this Embodiment 1 estimates the amount of data which will be stored in the buffer 10 until the automatic connection request period of time elapses, and determines, as the buffer storage period of time, a period of time during which data also containing the estimated amount of data are stored in the buffer 10.

Because the wireless communication device is configured in this way, the wireless communication device can control the paging operation appropriately according to an actual environment. Further, the wireless communication device can lengthen the automatic connection request period of time for which the wireless communication device does not have to change the paging operation.

While the present invention has been described in its preferred embodiment, it is to be understood that various changes can be made in an arbitrary component according to the embodiment, and an arbitrary component according to the embodiment can be omitted within the scope of the invention.

INDUSTRIAL APPLICABILITY

Because the wireless communication device according to the present invention reduces the influence of the automatic connection function for Bluetooth, thereby being able to ensure the communication quality of the wireless LAN, the wireless communication device is suitable for use as, for example, a wireless communication device equipped in a car navigation device.

EXPLANATIONS OF REFERENCE NUMERALS 1 wireless communication device, 2 wireless LAN communicator, 3 Bluetooth communicator, 4 communication establishment determinator, 5 real-time nature determinator, 6 degree of influence determinator, 7 automatic connection controller, 8 control changer, 9 application unit, 10 buffer, 21 wireless LAN terminal, and 22 Bluetooth terminal.

The invention claimed is:

1. A wireless communication device that can perform wireless communications using a wireless LAN method and wireless communications using a Bluetooth method, said wireless communication device comprising:
   a real-time nature determinator to determine whether or not said wireless communication device is performing wireless communications of data having real-time nature by using said wireless LAN method;
   an automatic connection controller to control an automatic connection operation in the wireless communications using said Bluetooth method;
   a degree of influence determinator to determine a degree of influence of paging a communications partner in said automatic connection operation upon the wireless communications using said wireless LAN method when said wireless communication device is performing wireless communications of data having real-time nature by using said wireless LAN method; and
   a control changer to change the paging operation by said automatic connection controller when said degree of influence is higher than a permissible upper limit, in such a way that said degree of influence is reduced.

2. The wireless communication device according to claim 1, wherein when said degree of influence is equal to or lower than said permissible upper limit, said control changer does not change the paging operation by said automatic connection controller.

3. The wireless communication device according to claim 1, wherein said wireless communication device includes a buffer to temporarily store said data having real-time nature, and wherein said degree of influence determinator determines, as parameters showing said degree of influence, a buffer storage period of time during which said data are stored in said buffer and an automatic connection request period of time during which the communications partner is paged in said automatic connection operation, and said control changer changes the paging operation by said automatic connection controller when said automatic connection request period of time is longer than said buffer storage period of time, in such a way that said automatic connection request period of time becomes shorter than said buffer storage period of time.

4. The wireless communication device according to claim 3, wherein said automatic connection controller pages the communications partner when said automatic connection request period of time is shorter than said buffer storage period of time.

5. The wireless communication device according to claim 3, wherein said degree of influence determinator estimates an amount of data which will be stored in said buffer until said automatic connection request period of time elapses, and determines, as said buffer storage period of time, a period of time during which said data also containing said estimated amount of data are stored in said buffer.

* * * * *